US012693422B2

(12) United States Patent
Son et al.

(10) Patent No.: US 12,693,422 B2
(45) Date of Patent: Jul. 28, 2026

(54) LiDAR DATA CONVERSION APPARATUS AND METHOD FOR TRAINING VARIOUS TYPES OF AUTONOMOUS VEHICLES BY USING PRE-ACQUIRED DATA

(71) Applicant: Korea Electronics Technology Institute, Seongnam-si (KR)

(72) Inventors: Haeng Seon Son, Seongnam-si (KR); Kyoung Won Min, Seongnam-si (KR); Seon Young Lee, Seoul (KR); Jin Man Park, Gwangju-si (KR); Young Bo Shim, Seongnam-si (KR); Chang Gue Park, Seoul (KR); Gi Ho Sung, Seongnam-si (KR); Yeong Kwon Choe, Seongnam-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 861 days.

(21) Appl. No.: 18/083,868

(22) Filed: Dec. 19, 2022

(65) Prior Publication Data

US 2023/0194722 A1     Jun. 22, 2023

(30) Foreign Application Priority Data

Dec. 21, 2021     (KR) ........................ 10-2021-0183271

(51) Int. Cl.
*G01S 17/89*     (2020.01)
*G01S 7/4861*     (2020.01)
(52) U.S. Cl.
CPC ............ *G01S 17/89* (2013.01); *G01S 7/4861* (2013.01)

(58) Field of Classification Search
CPC ...... G01S 17/89; G01S 17/931; G01S 7/4802; G01S 7/4808; G01S 7/4861
See application file for complete search history.

(56) References Cited

U.S. PATENT DOCUMENTS

2020/0116867 A1*  4/2020  Zhu .................... B60W 60/0011

FOREIGN PATENT DOCUMENTS

KR     10-2018-0055292 A     5/2018
KR         10-2083909 B1     3/2020
KR     10-2021-0040575 A     4/2021

OTHER PUBLICATIONS

Zhao, Yiming, et al, "FIDNet: LiDAR Point Cloud Semantic Segmentation with Fully Interpolation Decoding." 2021 IEEE/RSJ International Conference on Intelligent Robots and Systems (IROS). IEEE, 2021., (6 pages).

(Continued)

*Primary Examiner* — Hina F Ayub
(74) *Attorney, Agent, or Firm* — NSIP Law

(57) ABSTRACT

There are provided an apparatus and a method for LiDAR data conversion for training various types of autonomous vehicles by using pre-acquired data. A method for converting LiDAR data according to an embodiment includes: receiving an input of first LiDAR data which is pre-acquired through a first LiDAR sensor mounted in a first vehicle; converting the inputted first LiDAR data into second LiDAR data which is acquired through a second LiDAR sensor mounted in a second vehicle; and outputting the converted second LiDAR data, and converting includes converting the first LiDAR data into LiDAR data on a reference coordinate system, and converting the converted LiDAR data into the second LiDAR data which is LiDAR data on a coordinate system of the second LiDAR sensor.

19 Claims, 10 Drawing Sheets

(56)           References Cited

OTHER PUBLICATIONS

Korean Office Action issued on Jul. 16, 2024, in counterpart Korean Patent Application No. 10-2021-0183271 (7 pages in English, 9 pages in Korean).

* cited by examiner

Reference point (O) : A point at which a line extending vertically from a center of a rear wheel axis toward the ground meets the ground $$pitch = U_{FOV} - v_{resol} * v$$

$$yaw = -pi + h_{resol} * u$$

$$r = Range(u, v)$$

$$x = r\,cos(pitch)\,cos(yaw)$$

$$y = r\,cos(pitch)\,cos(yaw)$$

$$z = r\,sin(pitch)$$

$$label = Labels(u, v)$$

$$I = Intensity(u, v)$$

Labels

Intensity

Range 210      220      230      240

INPUT UNIT → PROCESSOR → OUTPUT UNIT → STORAGE

LiDAR DATA CONVERSION APPARATUS AND METHOD FOR TRAINING VARIOUS TYPES OF AUTONOMOUS VEHICLES BY USING PRE-ACQUIRED DATA

CROSS-REFERENCE TO RELATED APPLICATION(S) AND CLAIM OF PRIORITY

This application is based on and claims priority under 35 U.S.C. § 119 to Korean Patent Application No. 10-2021-0183271, filed on Dec. 21, 2021, in the Korean Intellectual Property Office, the disclosure of which is herein incorporated by reference in its entirety.

BACKGROUND

Field

The disclosure relates to training of autonomous vehicles, and more particularly, to an apparatus and a method for converting pre-acquired training data of a LiDAR sensor.

Description of Related Art

An autonomous vehicle may perform artificial intelligence (AI) learning by utilizing sensor data in order to recognize objects surrounding it. In this case, acquiring data used for learning through a sensor directly mounted in a vehicle to be developed, and then, generating training data and learning may result in the highest performance. However, the process of acquiring data to learn and generating labels of objects may require much time and effort.

Accordingly, AI learning may be performed by utilizing pre-acquired data like open data, for example, KITTI, etc. However, this method may have a problem that a sensor to be developed and a pre-acquired sensor have different characteristics and thus learning performance may be degraded. Characteristics of a sensor may refer to a difference between sensor models and a difference in mounting height and angle between sensors.

A related-art technology may learn by using a pre-acquired open data set as it is. However, when such a learning method is used, there may be a difference between a characteristic of a LiDAR sensor from which training data is acquired, and a characteristic of input data of a LiDAR sensor that should be really inferred, and a recognition rate may be degraded.

For example, it is assumed that a LiDAR sensor inference module to be used in an autonomous truck is trained by using a KITTI data set which is one of the data sets used the most by developers. Even when a LiDAR sensor of the same model as used for the KITTI data set is used in the autonomous truck, there is a difference in the mounting height of the LiDAR sensor as shown in FIG. 1.

If the height is different, an angle facing the ground and a viewing angle with neighboring vehicles at the height are also different. Accordingly, if training is performed by using the KITTI data set as it is and then inference is performed by inputting data acquired through a sensor mounted in the truck as shown in FIG. 2, a recognition rate may be degraded.

SUMMARY

The disclosure has been developed in order to solve the above-described problems, and an object of the disclosure is to provide an apparatus and a method for converting pre-acquired training data of a LiDAR sensor into a format of training data acquired from a LiDAR sensor mounted in a vehicle to be developed, as a solution for improving learning performance by pre-acquired data and increasing utilization of the pre-acquired data.

According to an embodiment of the disclosure to achieve the above-described object, there is provided a method for converting LiDAR data, the method including: receiving an input of first LiDAR data which is pre-acquired through a first LiDAR sensor mounted in a first vehicle; converting the inputted first LiDAR data into second LiDAR data which is acquired through a second LiDAR sensor mounted in a second vehicle; and outputting the converted second LiDAR data, wherein converting includes converting the first LiDAR data into LiDAR data on a reference coordinate system, and converting the converted LiDAR data into the second LiDAR data which is LiDAR data on a coordinate system of the second LiDAR sensor.

The reference coordinate system may have a center point of a rear wheel axis of a vehicle as an original point, and the reference coordinate system may have an X axis facing in a forward direction from the original point, a Y axis facing in a side direction, and a Z axis facing in a direction from the ground toward a space.

According to an embodiment, the method may further include performing spherical projection with respect to the second LiDAR data with reference to the coordinate axes of the second LiDAR sensor.

Performing the spherical projection may include, when two or more pieces of data overlap at a same position, leaving data that has a smaller range value, and discarding data that has a larger range value.

According to an embodiment, the method may further include performing interpolation with respect to the second LiDAR data which undergoes the spherical projection.

According to an embodiment, the method may further include performing semantic segmentation with respect to the inputted first LiDAR data.

In addition, performing the interpolation may include performing interpolation based on a result of the semantic segmentation.

Performing the interpolation may include performing interpolation with reference to left and right data after performing interpolation with reference to upper and lower data.

According to an embodiment, the method may further include converting the interpolated second LiDAR data into cloud point data, and outputting may include outputting the second LiDAR data converted into the cloud point data.

According to another embodiment, there is provided a LiDAR data conversion apparatus including: an input unit configured to receive an input of first LiDAR data which is pre-acquired through a first LiDAR sensor mounted in a first vehicle; a processor configured to convert the inputted first LiDAR data into second LiDAR data which is acquired through a second LiDAR sensor mounted in a second vehicle; and an output unit configured to output the converted second LiDAR data, wherein the processor is configured to convert the first LiDAR data into LiDAR data on a reference coordinate system, and to convert the converted LiDAR data into the second LiDAR data which is LiDAR data on a coordinate system of the second LiDAR sensor.

According to another embodiment, there is provided a method for converting LiDAR data, the method including: receiving an input of first LiDAR data which is pre-acquired through a first LiDAR sensor mounted in a first vehicle; converting the inputted first LiDAR data into second LiDAR data which is acquired through a second LiDAR sensor mounted in a second vehicle; and outputting the converted second LiDAR data, wherein the first LiDAR sensor and the second LiDAR sensor have different installation heights.

According to another embodiment, there is provided a LiDAR data conversion apparatus including: an input unit configured to receive an input of first LiDAR data which is pre-acquired through a first LiDAR sensor mounted in a first vehicle; a processor configured to convert the inputted first LiDAR data into second LiDAR data which is acquired through a second LiDAR sensor mounted in a second vehicle; and an output unit configured to output the converted second LiDAR data, wherein the first LiDAR sensor and the second LiDAR sensor have different installation heights.

According to embodiments of the disclosure as described above, pre-acquired data may be converted according to a developing vehicle mounting environment, so that inconsistency in data caused by a difference between an environment of a vehicle which acquires data and an environment of a developing vehicle may be solved and training performance may be enhanced, and autonomous driving recognition performance utilizing pre-acquired data may be enhanced.

In addition, according to embodiments of the disclosure, conversion may be performed by using pre-acquired data according to a mounting environment of various developing vehicles, and customized data processing industry may be actively developed, and it may be expected that a transaction of pre-acquired data is actively performed.

In addition, according to embodiments of the disclosure, high-capacity and high-quality training data may be ensured rapidly, and data acquired in a different vehicle environment may be converted into data converted by a vehicle itself, so that training data can be utilized without directly acquiring data.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Hereinafter, the disclosure will be described in more detail with reference to the accompanying drawings.

Embodiments of the disclosure propose an apparatus and a method for LiDAR data conversion, which are utilized for training various types of autonomous vehicles using pre-acquired data. There are provided an apparatus and a method for converting pre-acquired training data of a LiDAR sensor into a format of training data acquired in a LiDAR sensor mounted in a vehicle to be developed.

According to an embodiment, training performance of pre-acquired data may be enhanced and utilization of the pre-acquired data may be increased by converting a mounting position and a mounting angle of a LiDAR sensor at the time when training data is acquired into a mounting position and a mounting angle which are appropriate to a developing vehicle. In addition, data acquired by a vehicle itself may be generated by using LiDAR data acquired in a different type of vehicle without directly acquiring LiDAR data.

1. Configuration of Reference Coordinate Axes for Conversion of Sensor Mounting Position and Angle Data conversion may be performed only if a change in coordinate axes of a LiDAR sensor mounted in a vehicle A and in coordinate axes of a LiDAR sensor mounted in a vehicle B is recognized. If the A vehicle and the B vehicle are of the same type and have the same size, a change in the LiDAR coordinates of the A vehicle and a change in the LiDAR coordinates of the B vehicle after the coordinates of the A vehicle and the coordinates of the B vehicle overlap each other only have to be compared. However, since the A vehicle and the B vehicle are more likely to be different types of vehicles, a reference point for conversion of coordinate axes should be established on the vehicles.

Figure 1:
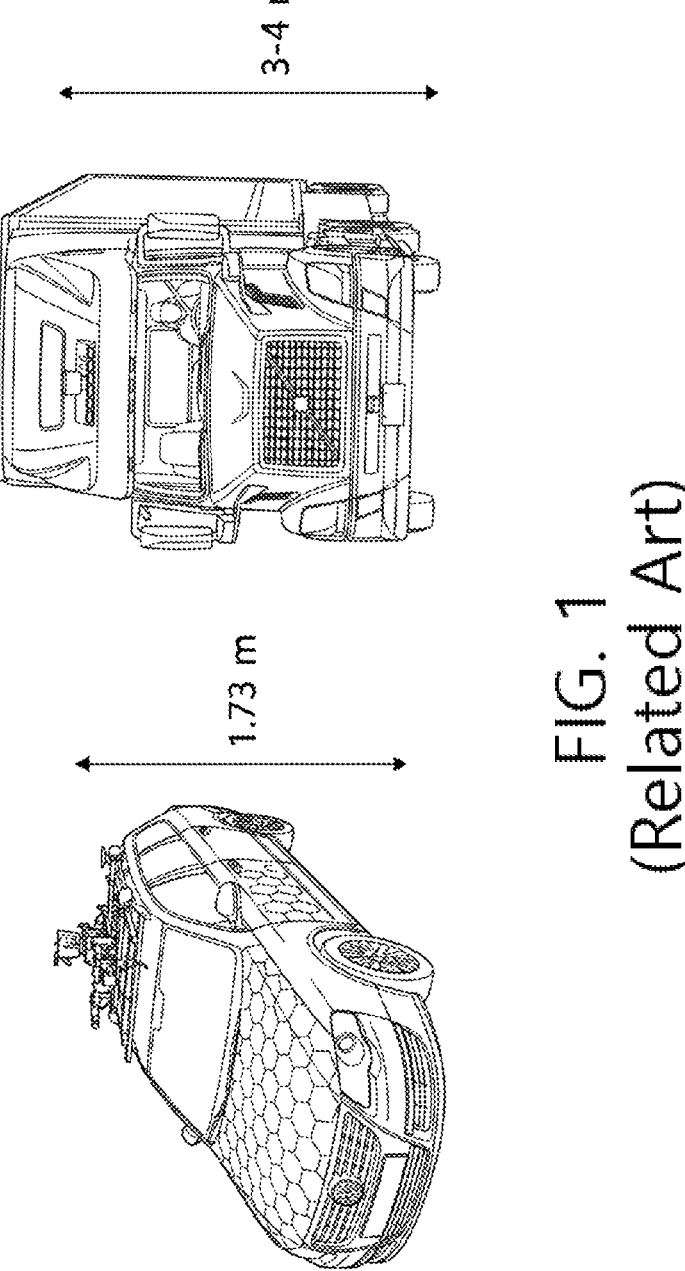
FIGS. 1 and 2 are views to explain an example of degradation of learning ability caused by a difference in height between mounted LiDAR sensors.
Figure 2:
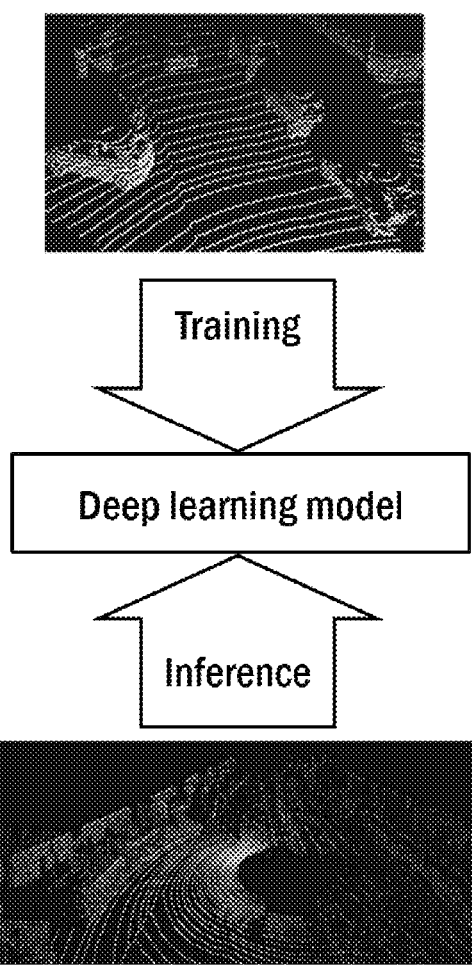
Figure 3:
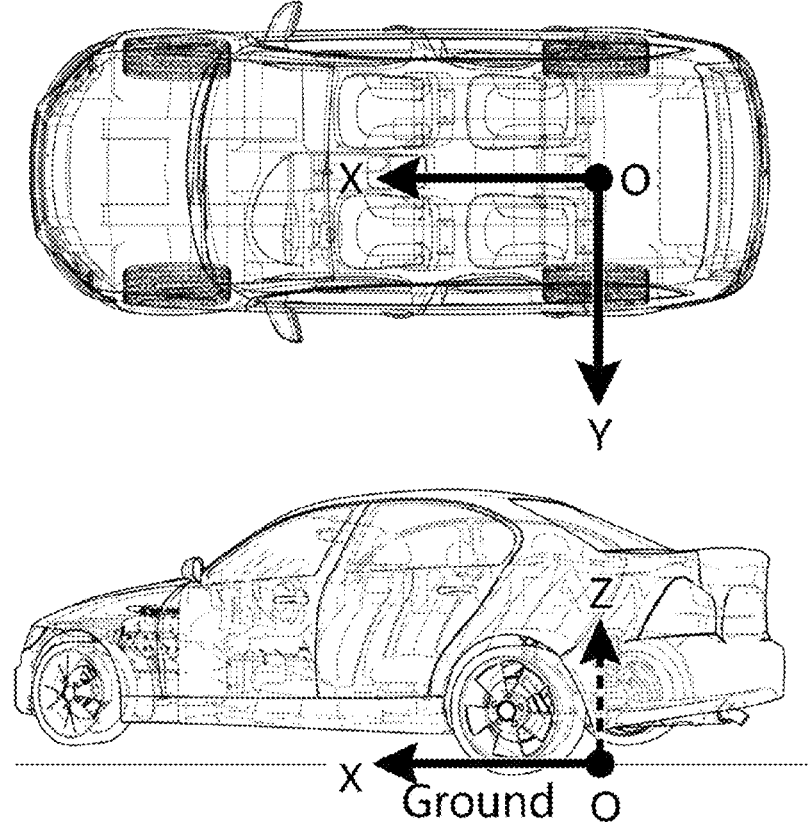
FIG. 3 is a view illustrating reference coordinate axes and a reference point of a vehicle.

In an embodiment of the disclosure, conversion reference coordinate axes for configuring a reference point of conversion for grasping a sensor mounting position conversion relationship are suggested as shown in FIG. 3. The reference point for conversion is a point at which a line vertically extending from the center of a rear wheel axis of the vehicle meets the ground, and, from the reference point as an original point, a direction toward the front is configured as an X axis and a direction toward the side is configured as a Y axis, and a direction from the ground toward a space is configured as a Z axis.

Figure 4:
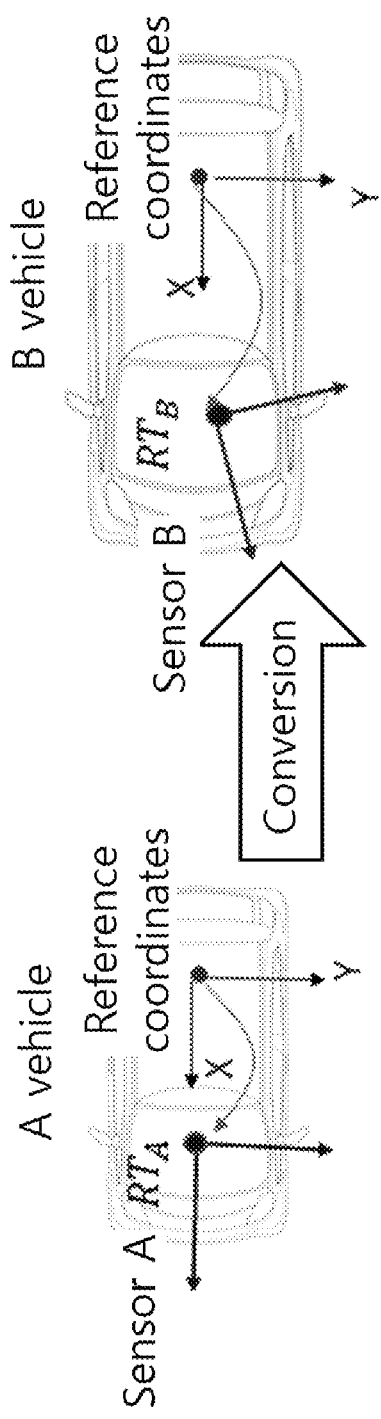
FIG. 4 is a view illustrating data conversion by registration of reference coordinate axes.
Figure 4:
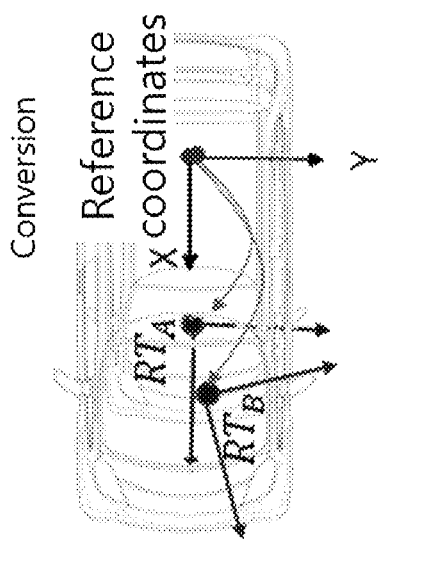

FIG. 4 illustrates data conversion by registration of reference coordinate axes. A senor A may be mounted in the A vehicle and a sensor B may be mounted in the B vehicle, and reference coordinate axes are configured in each vehicle as described above.

A relationship may be expressed by using a rotation matrix and a translation matrix according to a mounting position and a mounting angle of the sensor A on the reference coordinate axes of the A vehicle. R and T indicate the rotation matrix and the translation matrix, respectively, and are determined by a rotation angle and a mounting position according to mounting characteristics of the sensor A on the reference coordinate axes. A certain point $p_W$ on the reference coordinate axes may be converted into a point $p_A$ on the coordinates of the sensor A through the $RT_A$ matrix, and the following conversion equation may be applied:

$$RT_A = \begin{bmatrix} R & t \\ 0 & 1 \end{bmatrix} = \begin{bmatrix} r_{11} & r_{12} & r_{13} & t_x \\ r_{21} & r_{22} & r_{23} & t_y \\ r_{31} & r_{32} & r_{33} & t_z \\ 0 & 0 & 0 & 1 \end{bmatrix} \quad \text{Equation 1}$$

$$p_A = RT_A \times p_W$$

$$p_W = [x_W y_W z_W 1]^T$$

$$p_A = [x_A y_B z_A 1]^T$$

In the same way, the sensor B in the B vehicle may be indicated by a relationship $RT_B$ with the reference coordinate axes of the B vehicle.

$$p_B = RT_B \times p_W$$

A method for converting data of the sensor A into data of the sensor B after the reference coordinates axes of the A vehicle and the reference coordinates axes of the B vehicle are registered may be expressed as follows:

$$p_A = RT_A \times p_w \quad \text{Equation 2}$$

$$p_W = (RT_A)^{-1} \times p_A$$

$$p_B = RT_B \times p_w = RT_B \times (RT_A)^{-1} \times p_A$$

In this case, a translation matrix T by which data acquired at the sensor A mounted in the A vehicle is converted into data of the sensor B mounted in the vehicle B may be expressed as follows:

$$T = RT_B \times (RT_A)^{-1} \quad \text{Equation 3}$$

2. LiDAR Data Conversion Method

Embodiments of the disclosure suggest a method for converting data acquired at the LiDAR sensor A mounted in the A vehicle into data acquired at the LiDAR sensor B mounted in the B vehicle.

Figure 5:
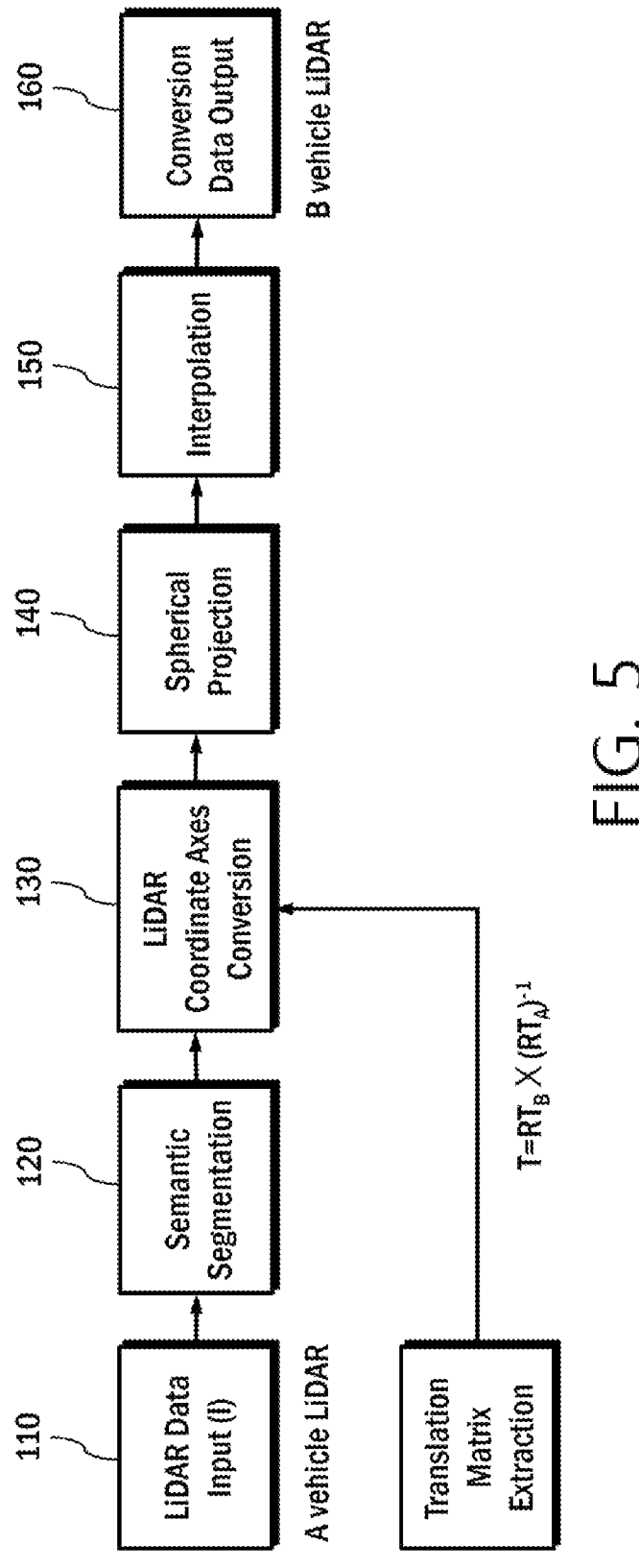
FIG. 5 is a view illustrating a LiDAR data conversion method according to an embodiment of the disclosure.

FIG. 5 is a view provided to explain a LiDAR data conversion method according to an embodiment. The LiDAR data conversion method according to an embodiment may include 1) a LiDAR data input step (110), 2) a semantic segmentation step (120), 3) a LiDAR coordinate axes conversion step (130), 4) a spherical projection step (140), 5) a surface interpolation step (150), and 6) a data generation and output step (160).

1) LiDAR Semantic Segmentation Step (120)

This is a step of distinguishing objects corresponding to respective points of LiDAR 3-dimensional (3D) point cloud data. Through this step, it is recognized what object each point cloud belongs to.

Figure 6:
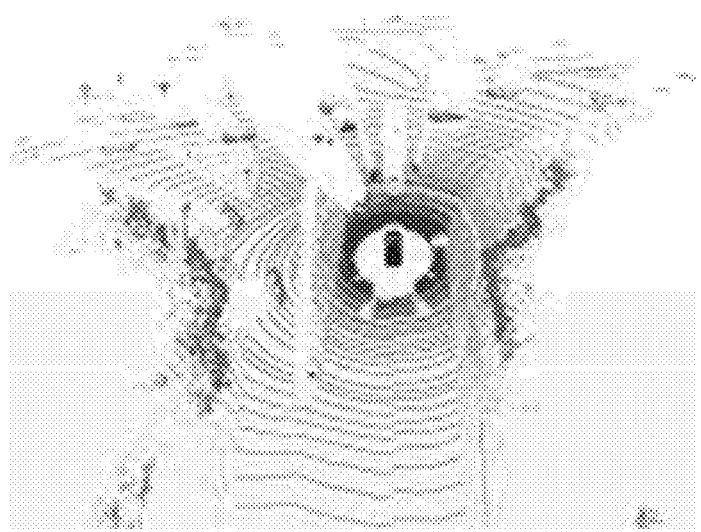
FIG. 6 is a view illustrating a result of LiDAR semantic segmentation.

A result of semantic segmentation may be visualized as shown in FIG. 6, and every object may be expressed by a specific color. Examples of representative LiDAR semantic segmentation algorithms are Pointseg, SqueezeSeg, SlasaNet, RangeNet++, or the like.

2) LiDAR Coordinate Axes Conversion Step (130)

After undergoing semantic segmentation, the LiDAR data acquired from the LiDAR sensor of the A vehicle may be converted into data of LiDAR coordinate axes of the B vehicle. The translation matrix may apply Equation 3 presented above, and an equation for conversion may be expressed by Equation 2. Equation 2 is described again as follows:

$$p_B = RT_B \times p_w = RT_B \times (RT_A)^{-1} \times p_A \quad \text{Equation 2}$$

3) LiDAR Spherical Projection Step (140)

Spherical projection is performed with respect to the coordinate axes of the LiDAR sensor mounted in the B vehicle. The spherical projection refers to aligning LiDAR data into a cylindrical 2D image data format.

Data in a horizontal direction may be aligned into data in an azimuth format, and data in a vertical direction may be aligned into data in an elevation angle format. The number of data in the horizontal direction corresponds to an azimuth resolution of the LiDAR sensor, and the number of data in the vertical direction corresponds to the number of channels of the LiDAR sensor. If a 64-channel LiDAR sensor is rotated by 360 degrees in the azimuth direction with a resolution of 0.1, the number of data u in the horizontal direction may be 3600, and the number of data v in the vertical direction may be 64.

Figure 7:
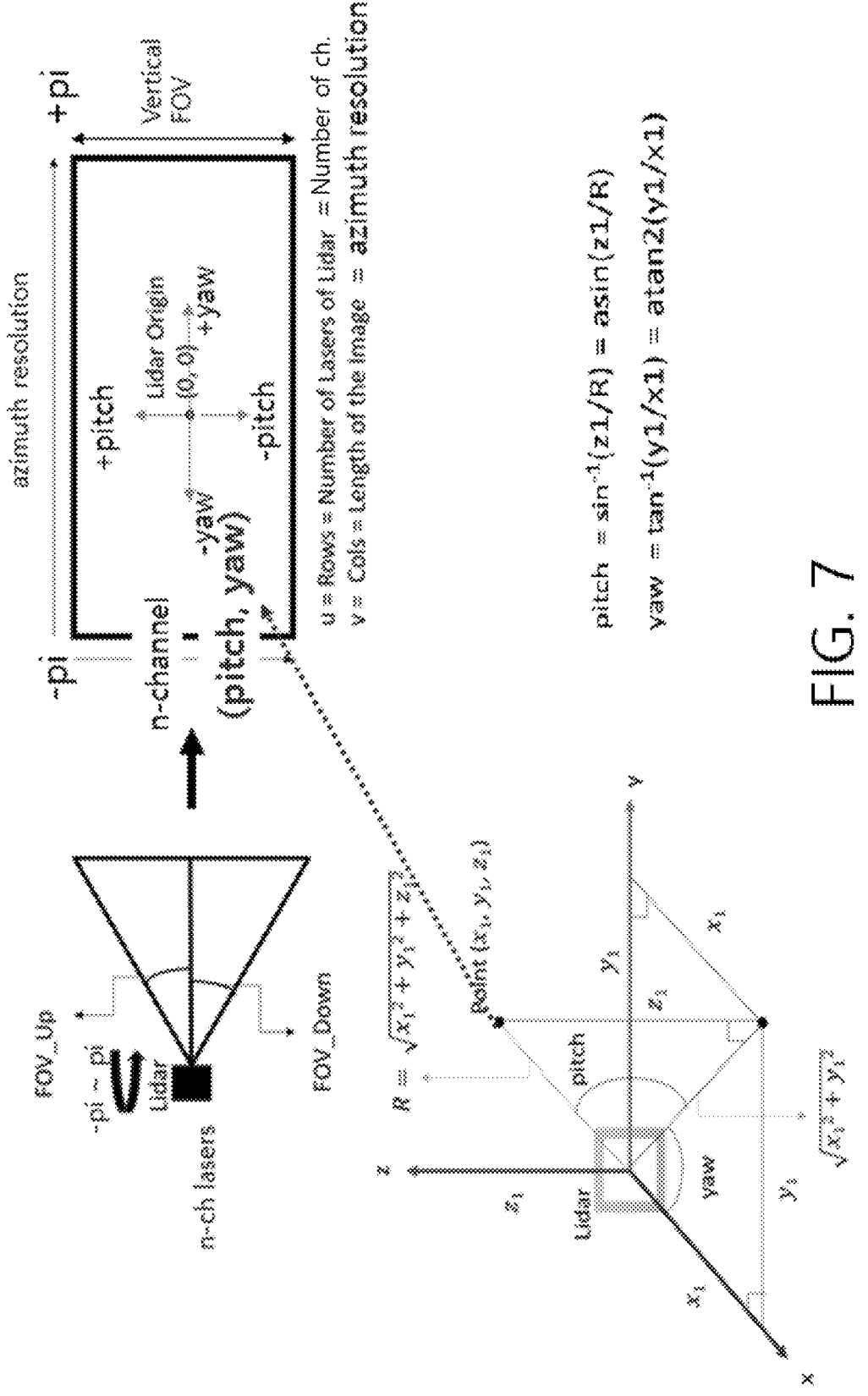
FIG. 7 is a conceptual diagram of LiDAR spherical projection.
Figure 8:
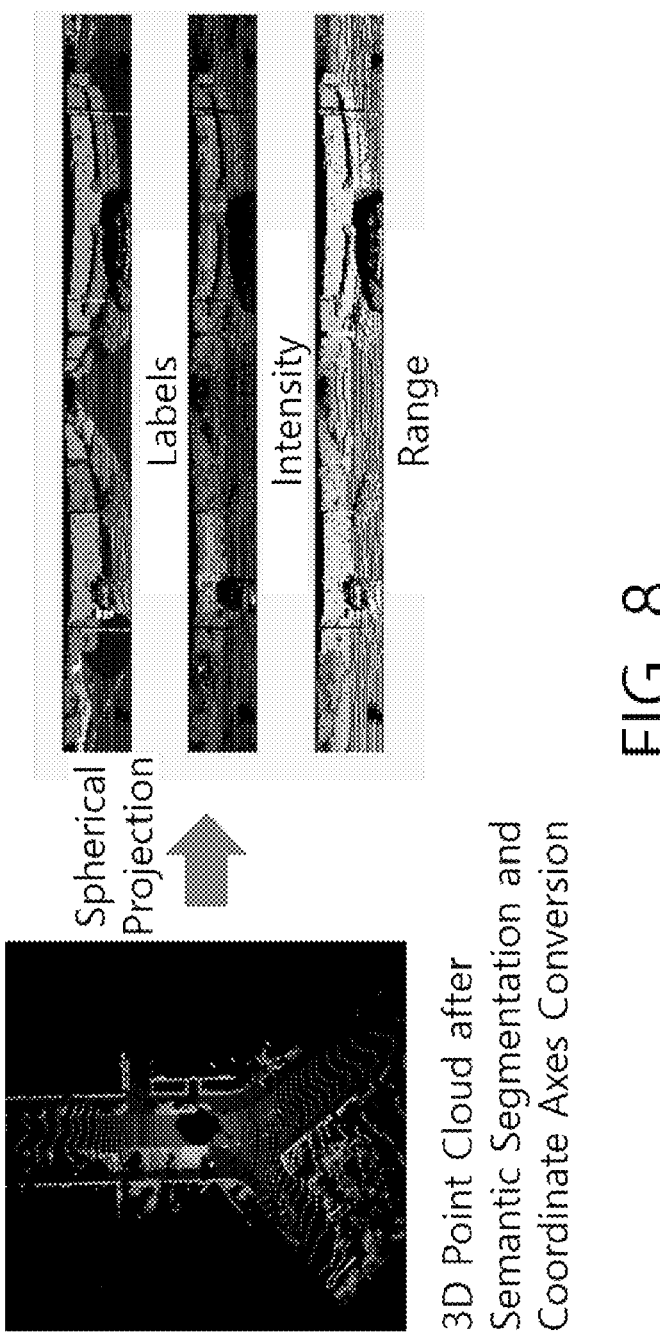
FIG. 8 is a view illustrating a result of extracting three pieces of 2D data through spherical projection.

As shown in FIG. 7, (pitch, yaw) may be obtained by using 3D data $(x_1, y_1, z_1)$, and then, data to be represented may be recorded on an area having corresponding pitch and yaw. In an embodiment of the disclosure, three pieces of 2D alignment data of label, intensity, range may be extracted through semantic segmentation of point clouds as shown in FIG. 8.

When two or more pieces of data overlap each other at the same position, data that has a smaller range may be left and data that has a larger range may be discarded.

4) Interpolation Step with Reference to a Label (150)

Data that is emptied after the spherical projection is performed may be filled through interpolation. In FIG. 8, a portion without data is expressed in black in FIG. 8. If upper data and lower data of an empty area have the same label, the empty area may be assigned the same label as upper and lower data, and the range may be filled with an average of the upper and lower data and the intensity value may be filled with a larger value.

If left and right data of the empty area have the same label, the empty area may be assigned the same label as left and right data in the same way, and the range may be filled with an average of the left and right data and the intensity may be filled with a larger value.

In this process, interpolation using the upper and low data may be performed, first, and then, interpolation using the left and right data may be performed

[Upper and Low Data Interpolation Method]

$$\text{if Labels } (u-1, v) = \text{Labels } (u+1, v),$$

$$\text{Labels } (u, v) = \text{Labels } (u, v-1)$$

$$\text{Range } (u, v) = \frac{\text{Range } (u, v-1) + \text{Range } (u, v+1)}{2}$$

$$\text{Intensity } (u, v) = \max(\text{Intensity}(u, v-1), \text{Intensity } (u, v+1))$$

5) Conversion Data Output Step (160)

Figure 9:
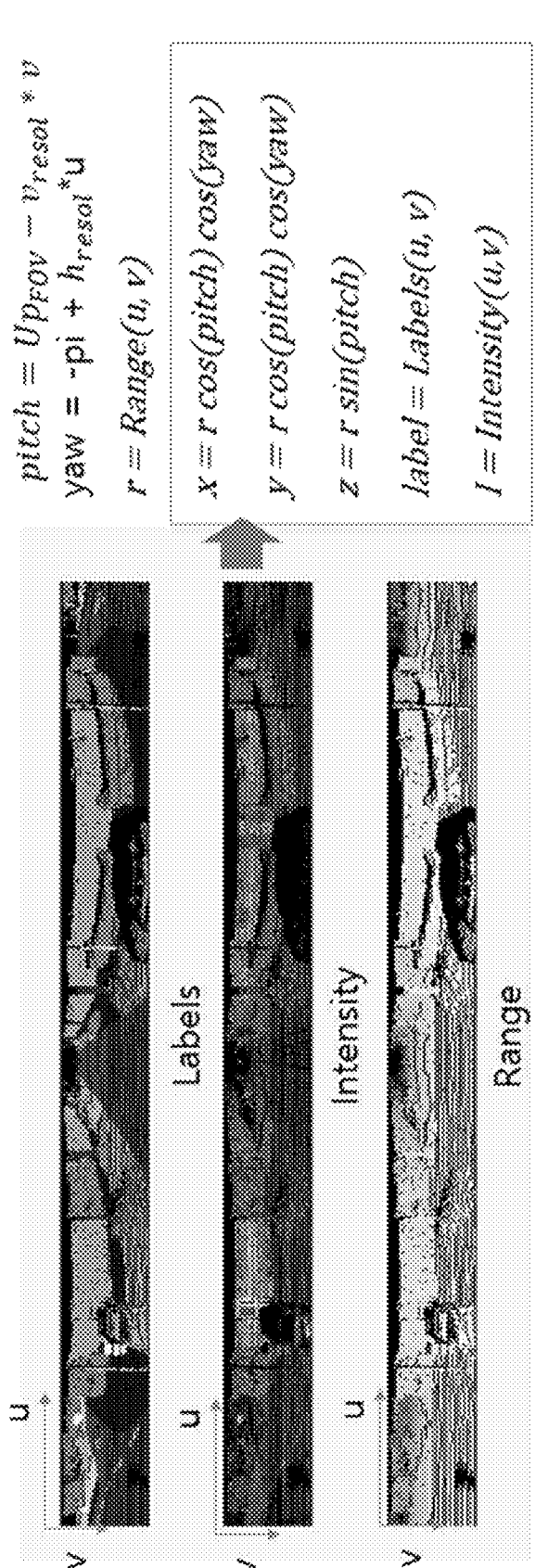
FIG. 9 is a view illustrating generation of point cloud data in the result of spherical projection.

A result of data alignment through spherical projection and interpolation may be converted back to 3D point cloud data. Specifically, as shown in FIG. 9, pitch and yaw angle values at a position (u, v) are calculated by using data at the position (u, v) of the spherical projection image, and then, x, y, z, label, intensity values are obtained, and 3D point cloud data is outputted.

3. LiDAR Data Conversion Apparatus

Figure 10:
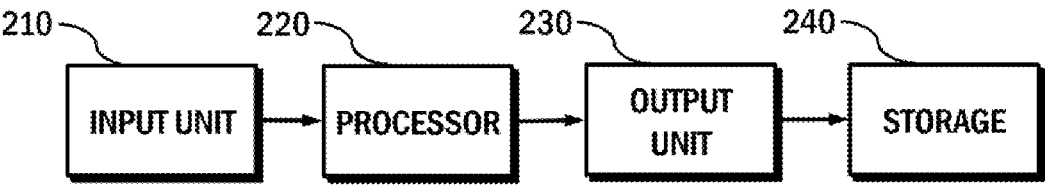
FIG. 10 is a view illustrating a LiDAR data conversion apparatus according to another embodiment of the disclosure.

FIG. 10 is a view illustrating a configuration of a LiDAR data conversion apparatus according to another embodiment. The LiDAR data conversion apparatus according to an embodiment may include an input unit 210, a processor 220, an output unit 230, and a storage 240 as shown in FIG. 10.

The input unit 210 is an interface for receiving an input of pre-acquired LiDAR data from an internal repository, another connected device, or an accessible network.

The processor 220 performs semantic segmentation, LiDAR coordinate axes conversion, spherical projection, surface interpolation, and point cloud data conversion with respect to the inputted LiDAR data.

The output unit 230 outputs converted LiDAR data outputted from the processor 220, and the storage 240 stores the converted LiDAR data outputted from the output unit 230. The LiDAR data stored in the storage 240 may be utilized as training data for the vehicle itself.

4. Variation

Up to now, the LiDAR data conversion apparatus and method for training various types of autonomous vehicles by using pre-acquired data have been described with reference to preferred embodiments.

In embodiments of the disclosure, by converting pre-acquired LiDAR data into data corresponding to a mounting position and a mounting angle of a LiDAR sensor to be developed, inconsistency in data used for AI learning and inference may be solved and high autonomous driving recognition performance may be ensured.

In order to acquire data, a sensor should be directly mounted in a vehicle and data logging should be performed. However, according to an embodiment of the disclosure, LiDAR data already acquired through a different vehicle may be converted into data that is acquired by a developing vehicle.

The technical concept of the present disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data.

For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

What is claimed is:

1. A processor-implemented method for converting LiDAR data, the method comprising:

receiving an input of first LiDAR data which is pre-acquired through a first LiDAR sensor mounted in a first vehicle;

converting the inputted first LiDAR data into second LiDAR data which is acquired through and corresponding to a second LiDAR sensor mounted in a second vehicle having a different installation height and a different mounting position from the first LiDAR sensor mounted in the first vehicle; and outputting the converted second LiDAR data to be used as a training dataset for the second vehicle in training autonomous driving features for the second vehicle, wherein the converting comprises converting the first LiDAR data into LiDAR data on a reference coordinate system, adjusting the LiDAR data based on a respective difference between the respective installation heights and the respective mounting positions of the first LiDAR sensor and the second LiDAR sensor, and converting the adjusted LiDAR data into the second LiDAR data which is LiDAR data on a coordinate system of the second LiDAR sensor, such that learning performance by pre-acquired sensor data is improved and utilization of the pre-acquired sensor data is increased.

2. The method of claim 1, wherein the reference coordinate system has a center point of a rear wheel axis of a vehicle as an original point, and wherein the reference coordinate system has an X axis facing in a forward direction from the original point, a Y axis facing in a side direction, and a Z axis facing in a direction from the ground toward a space.

3. The method of claim 1, further comprising performing spherical projection with respect to the second LiDAR data with reference to the coordinate axes of the second LIDAR sensor.

4. The method of claim 3, wherein the performing the spherical projection comprises, when two or more pieces of data overlap at a same position, leaving data that has a smaller range value, and discarding data that has a larger range value.

5. The method of claim 3, further comprising performing interpolation with respect to the second LiDAR data which undergoes the spherical projection.

6. The method of claim 5, further comprising performing semantic segmentation with respect to the inputted first LiDAR data.

7. The method of claim 6, wherein the performing the interpolation comprises performing interpolation based on a result of the semantic segmentation.

8. The method of claim 7, wherein the performing the interpolation comprises performing interpolation with reference to left and right data after performing interpolation with reference to upper and lower data.

9. The method of claim 5, further comprising converting the interpolated second LiDAR data into cloud point data,
    wherein the outputting comprises outputting the second LiDAR data converted into the cloud point data.

10. A LIDAR data conversion apparatus comprising:
one or more processors configured to:
receive an input of first LiDAR data which is pre-acquired through a first LiDAR sensor mounted in a first vehicle;
convert the inputted first LiDAR data into second LiDAR data which is acquired through and corresponding to a second LiDAR sensor mounted in a second vehicle having a different installation height and a different mounting position from the first LiDAR sensor mounted in the first vehicle; and
output the converted second LiDAR data to be used as a training dataset for the second vehicle in training autonomous driving features for the second vehicle,
wherein the one or more processors are configured to convert the first LiDAR data into LIDAR data on a reference coordinate system, adjusting the LiDAR data based on a respective difference between the respective installation heights and the respective mounting positions of the first LiDAR sensor and the second LiDAR sensor, and convert the converted LiDAR data into the second LiDAR data which is LiDAR data on a coordinate system of the second LiDAR sensor, such that learning performance by pre-acquired sensor data is improved and utilization of the pre-acquired sensor data is increased.

11. The apparatus of claim 10, wherein the reference coordinate system has a center point of a rear wheel axis of a vehicle as an original point, and
    wherein the reference coordinate system has an X axis facing in a forward direction from the original point, a Y axis facing in a side direction, and a Z axis facing in a direction from the ground toward a space.

12. The apparatus of claim 10, further comprising performing spherical projection with respect to the second LiDAR data with reference to the coordinate axes of the second LiDAR sensor.

13. The apparatus of claim 12, wherein, for the performing the spherical projection, the one or more processors are configured to, when two or more pieces of data overlap at a same position, leave data that has a smaller range value, and discard data that has a larger range value.

14. The apparatus of claim 12, wherein the one or more processors are configured to perform interpolation with respect to the second LiDAR data which undergoes the spherical projection.

15. The apparatus of claim 14, wherein the one or more processors are configured to perform semantic segmentation with respect to the inputted first LiDAR data.

16. The apparatus of claim 15, wherein for the performing the interpolation, the one or more processors are configured to perform interpolation based on a result of the semantic segmentation.

17. The apparatus of claim 16, wherein, for the performing the interpolation, the one or more processors are configured to perform interpolation with reference to left and right data after performing interpolation with reference to upper and lower data.

18. The apparatus of claim 14, wherein the one or more processors are configured to convert the interpolated second LiDAR data into cloud point data, and output the second LiDAR data converted into the cloud point data.

19. A method for converting LiDAR data, the method comprising:
    receiving an input of first LiDAR data which is pre-acquired through a first LiDAR sensor mounted in a first vehicle;
    converting the inputted first LiDAR data into second LiDAR data which is acquired through and corresponding to a second LiDAR sensor mounted in a second vehicle having a different installation height and a different mounting position from the first LiDAR sensor mounted in the first vehicle; and
    outputting the converted second LiDAR data to be used as a training dataset for the second vehicle in training autonomous driving features for the second vehicle,
    wherein the first LiDAR sensor and the second LiDAR sensor have different installation heights, and
    wherein the converting comprises converting the first LiDAR data into LiDAR data on a reference coordinate system, adjusting the LiDAR data based on a respective difference between the respective installation heights and the respective mounting positions of the first LIDAR sensor and the second LiDAR sensor, and converting the adjusted LiDAR data into the second LiDAR data which is LiDAR data on a coordinate system of the second LiDAR sensor, such that learning performance by pre-acquired sensor data is improved and utilization of the pre-acquired sensor data is increased.

* * * * *